United States Patent
Hayden et al.

(10) Patent No.: US 8,407,448 B1
(45) Date of Patent: Mar. 26, 2013

(54) SHARED STORAGE I/O ELIMINATION THROUGH MAPPING CLIENT INTEGRATION INTO A HYPERVISOR

(75) Inventors: John Hayden, Holliston, MA (US); Xiaoye Jiang, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 602 days.

(21) Appl. No.: 12/115,617

(22) Filed: May 6, 2008

(51) Int. Cl.
*G06F 12/10* (2006.01)
(52) U.S. Cl. .................. 711/203; 711/162; 711/E12.019
(58) Field of Classification Search .................. 711/112, 711/162, 202, 203, E12.019
See application file for complete search history.

(56) References Cited

U.S. PATENT DOCUMENTS

| | | | | |
|---|---|---|---|---|
| 6,611,901 | B1* | 8/2003 | Micka et al. | 711/162 |
| 2003/0115408 | A1* | 6/2003 | Milillo et al. | 711/113 |
| 2004/0133741 | A1* | 7/2004 | Kuwata | 711/113 |
| 2004/0260870 | A1* | 12/2004 | Factor et al. | 711/112 |
| 2004/0267835 | A1* | 12/2004 | Zwilling et al. | 707/202 |
| 2005/0055528 | A1* | 3/2005 | Arimilli et al. | 711/203 |
| 2005/0065986 | A1* | 3/2005 | Bixby et al. | 707/204 |
| 2005/0120080 | A1* | 6/2005 | Weinreb et al. | 709/203 |
| 2005/0262103 | A1* | 11/2005 | Stakutis et al. | 707/10 |
| 2006/0112242 | A1* | 5/2006 | McBride et al. | 711/161 |
| 2006/0206536 | A1* | 9/2006 | Sawdon et al. | 707/200 |
| 2006/0225065 | A1* | 10/2006 | Chandhok et al. | 717/168 |
| 2008/0005468 | A1* | 1/2008 | Faibish et al. | 711/114 |
| 2008/0244199 | A1* | 10/2008 | Nakamura et al. | 711/156 |
| 2008/0256141 | A1* | 10/2008 | Wayda et al. | 707/203 |
| 2009/0037418 | A1* | 2/2009 | Xu et al. | 707/8 |
| 2009/0043978 | A1* | 2/2009 | Sawdon et al. | 711/162 |
| 2009/0094603 | A1* | 4/2009 | Hiltgen et al. | 718/1 |
| 2009/0113420 | A1* | 4/2009 | Pawlowski | 718/1 |
| 2009/0260007 | A1* | 10/2009 | Beaty et al. | 718/1 |
| 2009/0276774 | A1* | 11/2009 | Kinoshita | 718/1 |

* cited by examiner

*Primary Examiner* — Hal Schnee
(74) *Attorney, Agent, or Firm* — Krishnendu Gupta; Gerald P. Kazanjian (57) ABSTRACT

This invention is a system and a method for performing an I/O in a virtual data storage environment using a new architecture. The system of performing an I/O includes a mapping client integrated into a client of the storage server which in communication with the mapping server included in the storage server retrieves the mapping of the special data sharing storage objects and caches the shared objects in the data cache include in the client environment. The method of accessing the data sharing storage objects by one or more applications running on a client reduces the number of I/O on the storage objects by caching the storage objects in the data cache and bringing the knowledge of data sharing into the client environment.

18 Claims, 12 Drawing Sheets

SHARED STORAGE I/O ELIMINATION THROUGH MAPPING CLIENT INTEGRATION INTO A HYPERVISOR

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to accessing disk storage in a data storage environment, and more particularly to a system and a method for performing an I/O in a storage virtualization environment.

BACKGROUND OF THE INVENTION

Network data storage is typically provided by an array of disk drives integrated with large semiconductor cache memory. A file server is used to interface the cached disk array to the network. The file server performs mapping of a network files to logical block addresses of storage in the cached disk array and move data between a network clients and the storage in the cached disk array. The file server use a network block services protocol in a configuration process in order to export to the network client logical volumes of the network-attached storage, which become local pseudo-disk instances. See, for example, Jiang et al., Patent Application Publication US 2004/0059822 A1 published Mar. 25, 2004, entitled "Network Block Services for Client Access of Network-Attached Storage in an IP Network," incorporated herein by reference. Network clients typically use a network file system access protocol to access one or more file systems maintained by the file server.

A Hypervisor, sometimes referred to as a virtualization manager, is a program that allows multiple operating systems, which can include different operating systems or multiple instances of the same operating system, to share a single hardware processor. Virtual infrastructure provides a layer of abstraction between computing, storage and networking hardware. The applications running on it gives administrators the advantage of managing pooled resources across the enterprise and enables the deployment of systems as virtual machines which are representation of a real machine using software that provides an operating environment which can run or host a guest operating system. Hypervisor by VMWare, provides a robust virtualization layer that enables each server to host multiple secure and portable virtual machines running side by side on the same physical server sharing the physical server resources that dramatically increases hardware utilization and decreases capital cost. Storage space from data storage system is presented to the Hypervisor system as volumes with logical unit numbers or, in the case of a network-attached storage, as NFS volumes. When the Hypervisor discovers a logical unit number, the LUN is treated as a single storage target. The LUN can then be addressed as a raw disk for a raw disk map, or managed as a VMFS Volume or an extent of a multi-extent VMFS Volume.

There remains a challenge of accessing the same data set by all nodes simultaneously. Scalability of the storage sharing is critical as the number of blades can increase dynamically, driven by the needs for new types of application. Storage access topology has direct impact on overall performance and resource utilization.

The storage technology described above, in combination with a continuing increase in disk drive storage density, file server processing power and network bandwidth at decreasing cost, has provided network clients with more than an adequate supply of network storage capacity at affordable prices. When consolidating thousands of Virtual Machines, thousand times the storage of a single virtual machine in the core is required. This would also require thousand I/Os on a single shared resource.

Reducing the time it takes to perform an I/O and reducing the number of physical I/Os in combination of de-duplication of the storage would be advancement in the data storage computer-related arts. This is becoming increasingly important as the amount of information being handled and stored grows geometrically over short time periods and such environments add more file systems and data at a rapid pace.

SUMMARY OF THE INVENTION

To overcome the problems described above and to provide the advantages also described above, the present invention in one embodiment includes a system for performing an I/O in a storage virtualization environment consisting of a storage server, a data storage system, and a client of the storage server. The storage server includes a mapping service that organizes one or more storage objects as a set of related objects indicating a portion of data that is shared among the one or more storage objects. The data storage system provides the physical space to the storage server for storing one or more storage objects. The client of the storage server includes a mapping client for the mapping service and a data cache and presents the one or more storage objects organized as related objects on the file server as logically addressable objects to one or more applications running on the client environment. The mapping client provides the mapping between a logical addressable storage object to its physical location on the data storage system and caches the physical address and contents of the storage objects in the data cache.

In another embodiment method steps are carried out for performing an I/O on a storage object in a storage virtualization environment consisting of a storage server, a data storage system and a client of the storage server. The method includes retrieving a physical location for a logically addressable storage object that is presented to one or more applications running in the client environment by the client. The client presents the one or more storage objects organized as related objects indicating a portion of data that is shared among the one or more storage objects on the file server as logically addressable objects to one or more applications running in the client environment. The mapping client provides the mapping between a logical addressable storage object to its physical location on the data storage system. The method then examines a data cache included in the client to find the physical address of the storage object and completes the I/O on finding the block in the data cache.

In another embodiment, a program product includes a computer-readable medium having code included on the medium configured to carry out computer-executed steps that are similar or identical to those described above with reference to the embodiment of the method.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

The methods and apparatus of the present invention are intended for use in a data storage environment that include data storage systems, such as the Symmetrix Integrated Cache Disk Array system or the Clariion Disk Array system available from EMC Corporation of Hopkinton, Mass. and those provided by vendors other than EMC, Hypervisor available from VMWare and a file server such as Celerra File Server, which is available from EMC Corporation of Hopkinton, Mass.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. The program code (software-based logic) for carrying out the method is embodied as part of the system described below.

Overview

The embodiment of the present invention reduces the number of physical I/O's and time spent in I/Os that are required to access the various storage objects by a application running in a client of a storage server by integrating a mapping client along with a physical data cache in the client's operating system or kernel that provides access to storage objects on a file server organized as related set of objects sharing data among themselves. This provides the applications to access the shared storage objects presented to them by the client without generating an I/O for every request. For example, thousands of virtual machines can be booted faster and requires less storage space due to integration of version files that only keeps unique blocks.

The new architecture also allows for quick access to shared storage objects that are cached in the client of the application providing virtual storage environment. The applications running on the client has multiple views of shared storage objects and the present invention passes that information to the application. By bringing the delegation of commonality from storage server to the client of the storage server and applications running on it, the present invention further exploits the benefit of de-duplication. Advantages provided include: (1) reduction of overall I/O requirements of a system; (2) higher reliability, consistency and low latency in accessing the storage volumes; (3) storage consolidation and economical use of resources; and (4) scalability by supporting many virtual machines that share the file resources.

Architecture

Figure 1:
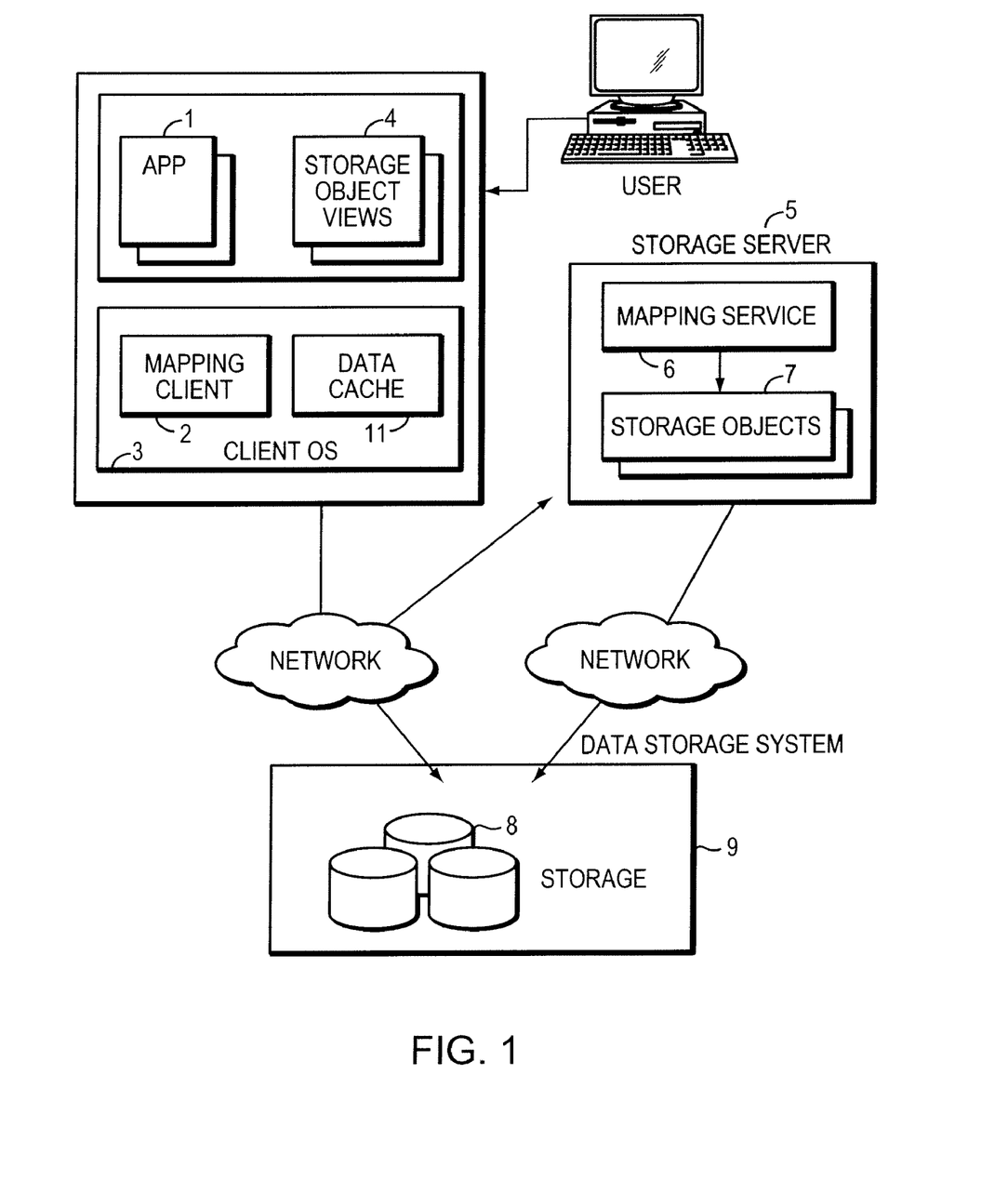
FIG. 1 is a block diagram showing a storage virtualization environment including a new architecture embodying the present invention and which is useful in such an environment.

Referring now to FIG. 1, reference is now made to a storage virtualization environment consisting of a storage server 5, a data storage system 9, and a client of the storage server 3. The storage server 5 includes a mapping service 6 that organizes one or more storage objects 7 as a set of related objects indicating a portion of data that is shared among the one or more storage objects. The data storage system 9 provides the physical space 8 to the storage server for storing one or more storage objects. The client 3 of the storage server includes a mapping client 2 for the mapping service and a data cache 11 and presents the one or more storage objects 7 organized as related objects on the file server as logically addressable storage objects 4 to one or more applications 1 running on the client environment. The mapping client provides the mapping between a logically addressable storage object 4 to its physical location 8 on the data storage system 9 and caches the physical address and contents of the logically addressable storage objects in the data cache 11.

In storage technology, deduplication essentially refers to the elimination of redundant data. In the deduplication process, duplicate data is deleted, leaving only one copy of the data to be stored. However, indexing of all data is still retained should that data ever be required. Deduplication is able to reduce the required storage capacity since only the unique data is stored. Deduplication is also written as de-duplication, and is synonymous with data reduction or commonality factoring.

Data deduplication can generally operate at the file, block, and even the bit level. File deduplication eliminates duplicate files, but this is not a very efficient means of deduplication. Block and bit deduplication looks within a file and saves unique iterations of each block or bit. If a file is updated, only the changed data is saved. That is, if only a few bytes of a document or presentation are changed, only the changed blocks or bytes are saved, the changes don't constitute an entirely new file. This behavior makes block and bit deduplication far more efficient.

Figure 2:
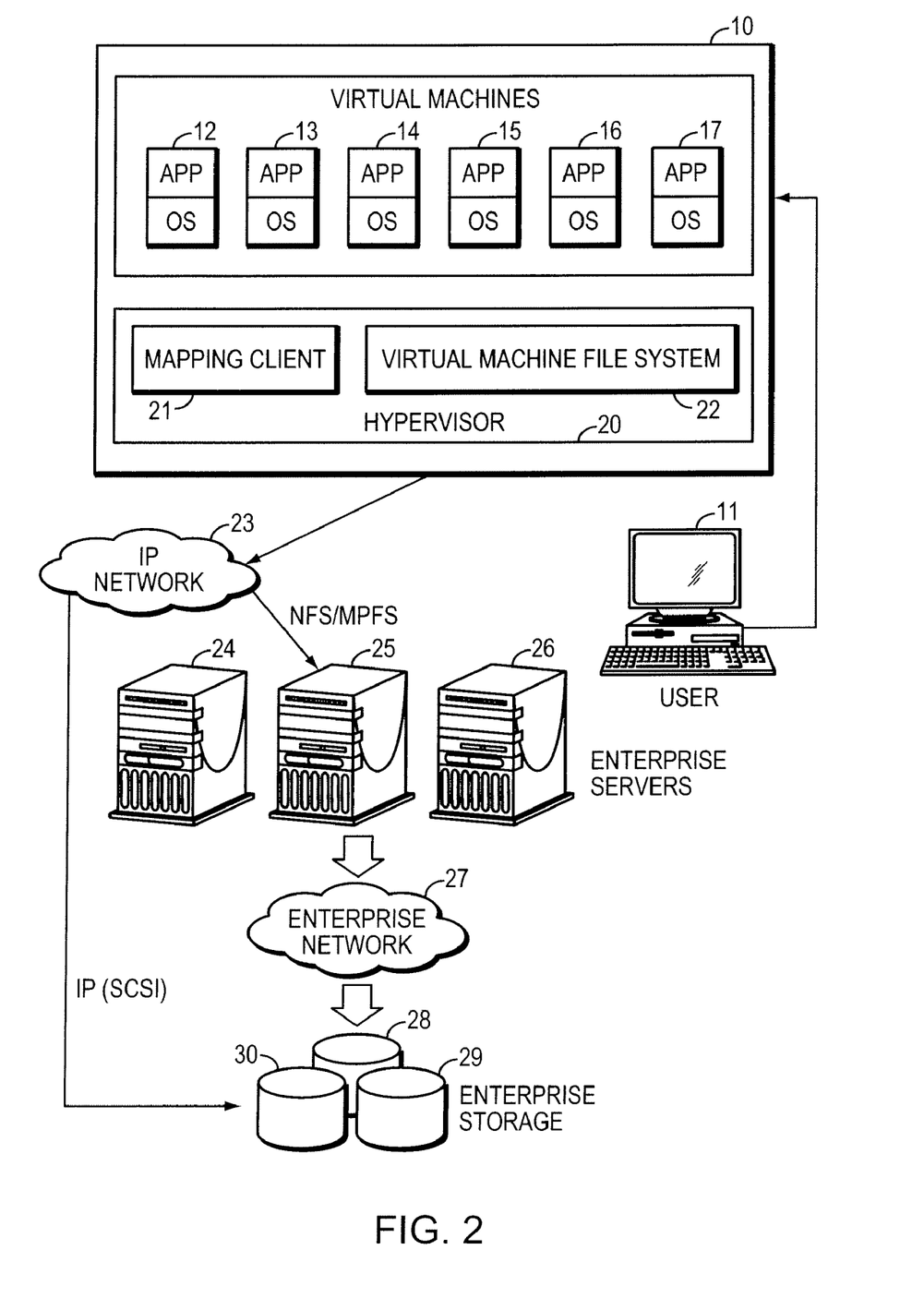
FIG. 2 is a block diagram showing a storage virtualization environment including a new architecture embodying the one way of implementing present invention and which is useful in such an environment.

Referring now to FIG. 2, reference is now made to a storage virtualization environment 10 including an Enterprise File Server 24-26, host machine running Hypervisor 20 and a data storage subsystem 28-30. Virtualization infrastructure consists of virtualization software that provides server consolidation by allowing several instances of similar and dissimilar operating systems to run as virtual machines 12-17 on one physical machine. The virtualization software may be Hypervisor running directly on the host hardware, allowing virtual machines containing guest operating system to run on top of the virtualization layer provided by VMWare. Storage is presented as a set of virtual devices that share from a pool of disk resources. Storage is used for both virtual machine boot disk image as well as virtual disk storage for application data. The virtual disks are assigned to a virtual machine and are managed by the guest operating system just like a standard SCSI device. Multiple applications running on the Hypervisor can access the same repository for files or folders containing virtual disks.

The data storage system includes disks or storage 28-30 mapped to Logical Unit of Storage (LUN) that act as a virtual disks that are presented for access to hosts such as enterprise file server 24-26 for I/O operations. LUN's are also sometime referred to interchangeably with data volumes, which at a logical level represent physical storage. Storage space is presented to the Hypervisor system as volumes with logical unit numbers or, in the case of a network-attached storage, as NFS volumes. When the Hypervisor discovers a logical unit number, the LUN is treated as a single storage target. The LUN can then be addressed as a raw disk for a raw disk map (RDM), or managed as a VMFS Volume or an extent of a multi-extent VMFS Volume. Hypervisor provides the capability to create a datastore from a NFS file system export or an iSCSI LUN. The NFS datastore is viewed as a pool of space used to support virtual disks. One or more virtual disks are created within datastore and assigned to virtual machines. The virtual machine file system (VMFS) 22 is the default disk configuration option for Hypervisor. The client 11 formats an iSCSI LUN as VMFS3 which is used to create a datastore for virtual disks, virtual machine configuration files, snapshot (snap) log files, and the file system metadata.

Mapping Client 21 residing in Hypervisor uses NFS or File Mapping Protocol to communicate with the enterprise file server through IP network 23 for the location of the file or to allocate space for the file and then performs an I/O directly to the on-disk volume through IP network using SCSI protocol.

Figure 3:
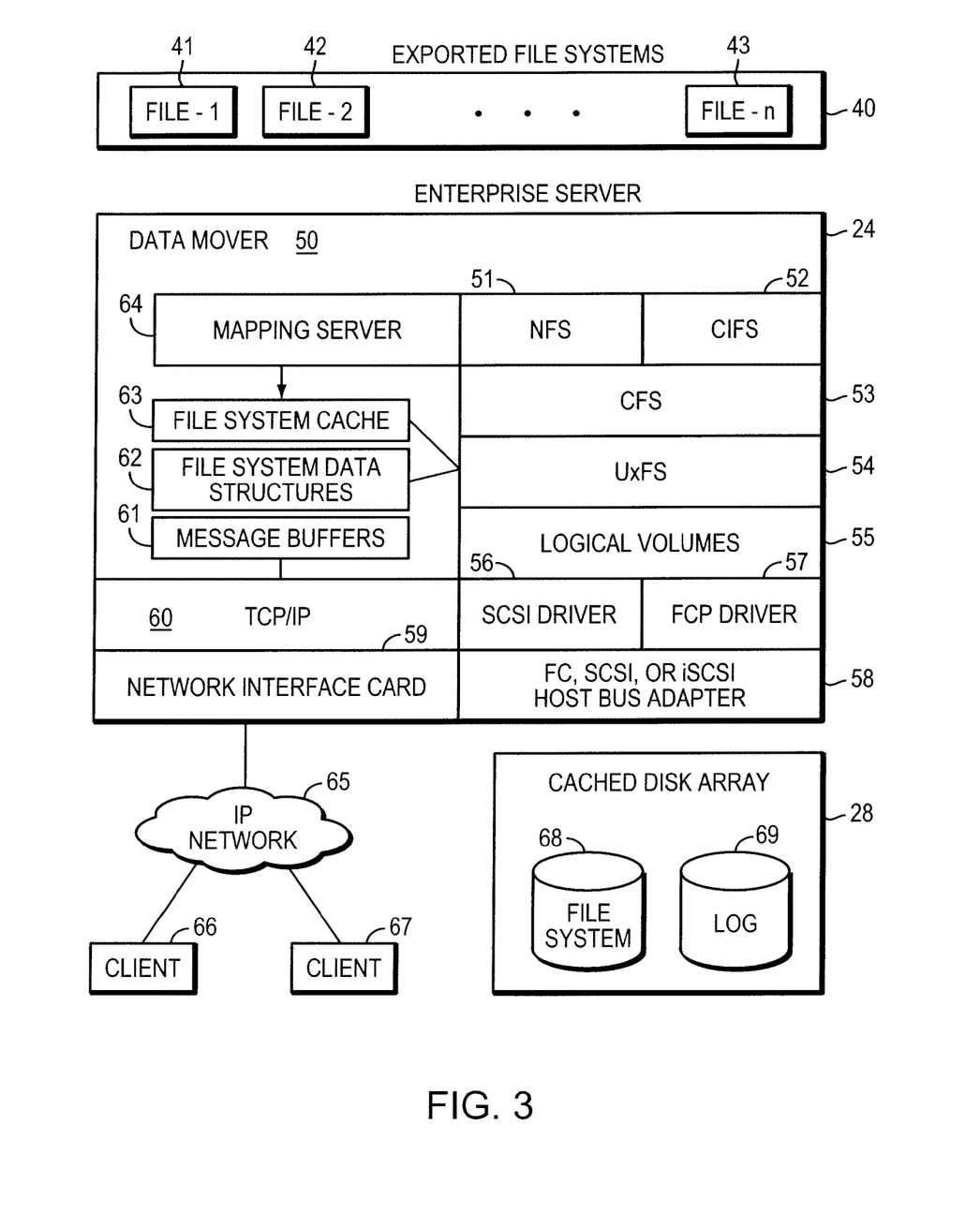
FIG. 3 is a block diagram showing further details of the network file server in the storage virtualization environment of FIG. 1.

Reference is made to FIG. 3, showing a functional block diagram of a network file server. The network file server 24, for example, has one or more data mover computers 50 for moving data between the IP network 65 and a cached disk array 28. Further details regarding the network file server 24 are found in Vahalia et al., U.S. Pat. No. 5,893,140, incorporated herein by reference, and Xu et al., U.S. Pat. No. 6,324, 581, issued Nov. 27, 2001, incorporated herein by reference. The network file server 24 is managed as a dedicated network appliance, integrated with popular network operating systems in a way, which, other than its superior performance, is transparent to the end user.

The data mover 50 has a Network File System (NFS) module 51 for supporting communication among the clients and data movers or Hypervisor 20 of FIG. 1 over the IP network 23 using the NFS file access protocol, and a Common Internet File System (CIFS) module 52 for supporting communication over the IP network using the CIFS file access protocol. The data mover 50 also has a Mapping Server 64 for supporting communications among the Hypervisor and data movers over the IP network 23 using the File Mapping Protocol (FMP). The NFS module 51 and the CIFS module 52 are layered over a Common File System (CFS) module 53, and the CFS module is layered over a Universal File System (UxFS) module 54. The UxFS module supports a UNIX-based file system, and the CFS module 53 provides higher-level functions common to NFS, Mapping Server and CIFS.

The UxFS module accesses data organized into logical volumes defined by a module 55. Each logical volume maps to contiguous logical storage addresses in the cached disk array 28. The module 55 is layered over a SCSI driver 56 and a Fibre-channel protocol (FCP) driver 57. The data mover 50 sends storage access requests through a host bus adapter 58 using the SCSI protocol, the iSCSI protocol, or the Fibre-Channel protocol, depending on the physical link between the data mover 50 and the cached disk array 28.

A network interface card 59 in the data mover 50 receives IP data packets from the IP network 65. A TCP/IP module 60 decodes data from the IP data packets for the TCP connection and stores the data in message buffers 61. For example, the UxFS layer 54 writes data from the message buffers 61 to a file system 68 in the cached disk array 28. The UxFS layer 54 also reads data from the file system 68 or a file system cache 63 and copies the data into the message buffers 51 for transmission to the network clients 66-67.

To maintain the file system 40 in a consistent state during concurrent writes to a file, the UxFS layer maintains file system data structures 62 in random access memory of the data mover 50. To enable recovery of the file system 40 to a consistent state after a system crash, the UxFS layer writes file metadata to a log 69 in the cached disk array during the commit of certain write operations to the file system 40.

Files 41-43 are stored and handled in chunks. Each such chunk is called a File block. Clients view a file as a linear sequence of File Logical Blocks. Each File Logical Block is assigned a Logical Block Number. Files are stored in a file system 40. A file system resides on a single logical volume. The logical volume is divided into File System Logical Blocks. Usually a file does not reside on contiguous File System Logical Blocks and it is the file system responsibility to maintain the mapping between the File Logical Blocks and the File System Logical Blocks. A file system is stored on a single or multiple physical disks. Each disk is divided into Physical Disk Blocks, each of which is addressable and can provide storage to a File System Logical Block. A file system is not necessarily stored on contiguous physical blocks. The Volume Manager maintains the mapping between the File System Logical Blocks to the Physical Disk Block.

Mapping server 64 provides the Hypervisor 20 of FIG. 1 with the mapping between the logical views of the file to the location where it is stored on the physical disks. The mapping client 21 of FIG. 1 uses this information to get to the disks it has to access. The client will then read data directly from the storage. Mapping server that creates and manages a file system used as a pool of free data blocks that have been reserved for allocation to file systems that are owned by the primary data mover.

Figure 4:
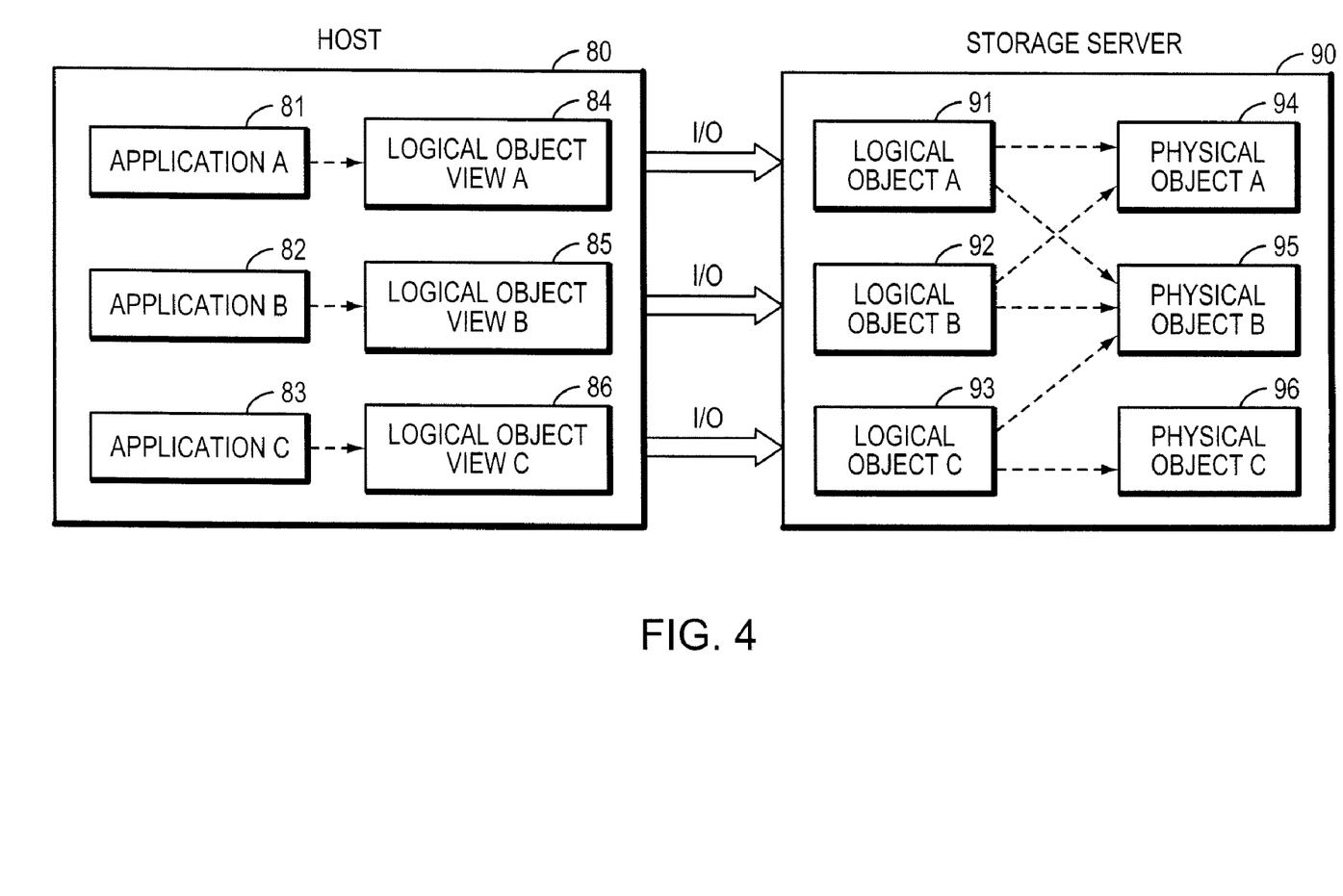
FIG. 4 is a block diagram showing an organization of an object accessed by a client of a host providing a storage virtualization infrastructure in FIG. 1.

FIG. 4 shows the layout of an object on a storage server 90 being accessed by a host 80 providing the virtualization. Host could be Hypervisor 20 of FIG. 1. Physical objects 94-96 represent the actual object as it exists on the physical disk storage. These physical objects are represented by physical blocks. The logical objects 91-93 represent the mapping of these objects to its actual physical location represented by physical objects 94-96. This mapping could be logical block address to physical block address on the disk storage. The logical object could share one or more physical objects. The host 80 includes one or more applications 81-83 where the applications have a writeable logical view 84-86 for each of the logical object 91-93 included on the storage server. The logical object view 84-86 could be a view of a virtual machine running on a host server providing virtualization. More than one virtual machine could be sharing the same physical object. Under the prior art, the host server will have no knowledge of this mapping of logical object to physical object and every logical object would generate its own I/O request.

When consolidating hundreds of Virtual Machines under prior art, it would require hundred times the storage of a single virtual machine. By using the version file technology file system can keep only the unique blocks needed and thus reducing the need for storage. Combining the file versioning technology with the mapping of logical to physical object would reduce the I/O by streamlining the I/O performed on a single shared resource.

Version files are an extended foil of UxFS regular file. Version files allow creating a point in time snapshot of the file. Each file object is represented by an Inode object. The Inode includes a mapping to the files data blocks. The mapping involves storing lists of pointers in file system blocks known as indirect blocks. There may be several levels of these indirect blocks. File versions are individual files, each with its own Inode. Version files create snapshots by sharing both data blocks and indirect blocks when possible. The original file and the snapshot share both data blocks as well as indirect blocks. When file is modified by a user, write is issued to a data block. To modify the data block, a new data block is allocated. Further, in order to point to the new data block, a new indirect block is allocated. The entire version file mechanism is based on the ability to differentiate between pointers that point to the blocks that are owned by a mode and pointers to blocks which are merely shared with the owner and possibly others. When a snap shot is taken all of the blocks in the original file are becomes read-only and non-owner. File versions are represented by a collection of file Modes. These modes are linked together through fields in the modes. Version set consists of a writable LUN file, referred to as a working file. It may have some number of snapshots or versions. The working file and the versions are linked together by a singly linked chain of pointers in the a_time field of the mode. This link starts at the working file and points to the newest snap, if one exists. Snap is the creation of an exact, point-in-time copy of the working file. Snap involves allocating a new mode to hold the snap, copying the contents of the working file mode to the snap and marking the working file pointers to all be shared. Finally the new snap is linked into the version chain and some file system information is logged and/or flushed.

Figure 5:
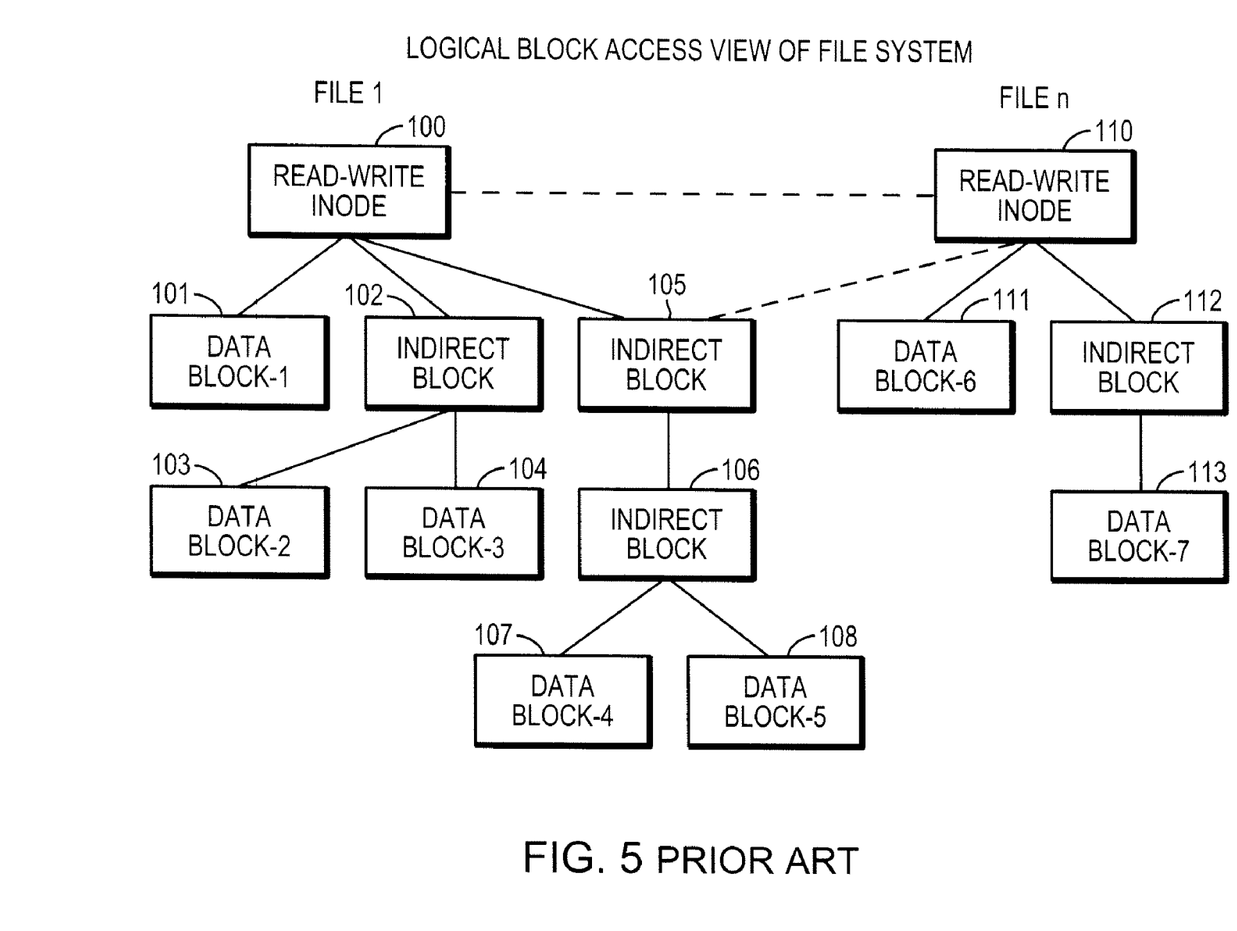
FIG. 5 is a block diagram of a conventional layout of a file.

FIG. 5 shows a read-write file as maintained by the UxFS layer. The file has a hierarchical organization, depicted as an inverted tree. The file includes a read-write mode 100, a data block 101 and an indirect block 102 linked to the read-write mode, a data block 103 and a data block 104 linked to the indirect block 102, and data blocks 107 and 108 linked to the indirect block 106 which is linked to an indirect block 105. Another file includes a read-write mode 110 which further includes a data block 111 an indirect block 112 linked to a data block 113. Multiple files could be sharing same physical block. An indirect block 105 could be shared by two files 100 and 110 but the knowledge of the shared block is not known to the user of the files under the prior art.

Figure 6:
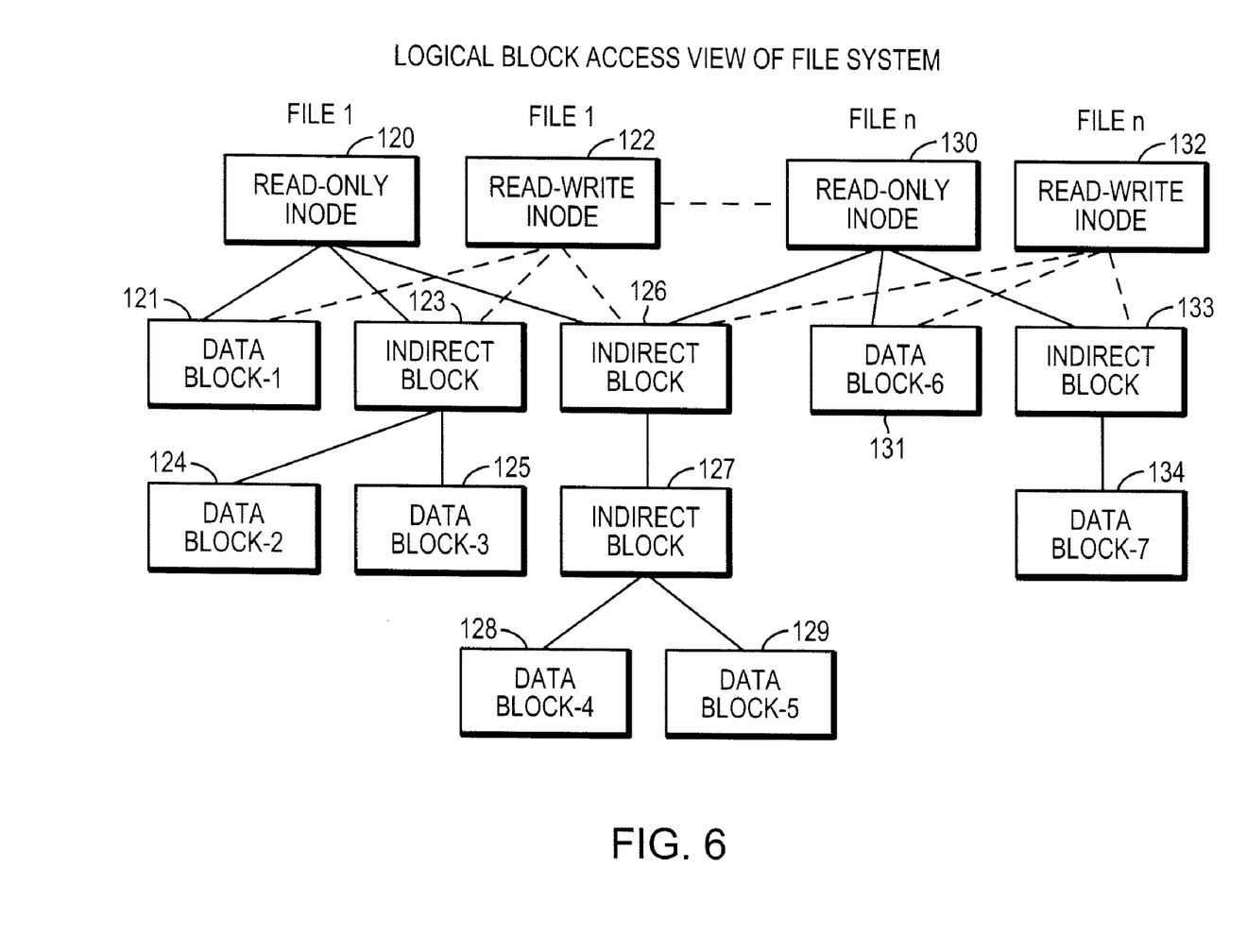
FIG. 6 is a block diagram of a file version set including a read-only and read-write snapshot copies of a file.

FIG. 6 shows the read-write file of FIG. 5 after creation of a read-only snapshot copy of the read-write file. The read-only mode 120 is a copy of the read-write mode 122. The read-write mode 122 has been modified to indicate that the data block 121 and the indirect block 126 are shared with a read-only snapshot copy. Similarly another file is represented by read-write mode 132 and read-only mode 130 is a copy of the read-write mode. In order to facilitate the use of multiple read-only and read-write snapshot copies, these are defined as a file version set including read-only and read-write snapshot copies produced from an original read-write file. The original read-write file is referred as the production file. The read-only snapshot copies are referred to as read-only versions, or simply versions.

When there is only a production file, with no read-only snapshot copies, the production file owns all of its blocks. When the first read-only snapshot copy file is created, all of the blocks are passed to the new snapshot copy file and it becomes the owner of all of the blocks. The production file still uses the same blocks and the same blocks have identical contents (at least initially); however, it has become a non-owner of those blocks. If any block of the production file is modified, then a new version of that block is allocated and the production file will own that new block. (The new version of the block will be a different block of storage mapped to the same logical address in the file as the original version of the block.) As more snapshot files are created, different snapshot files may own different versions of a block. The owner of any particular block will always be the oldest snapshot copy that uses an identical version of a block, and the oldest snapshot copy will always own all of its blocks. When a sparse file is used, each time a new block is written to it will use the same UxFS allocation mechanism regardless of who owns the data block, the production file or one of the snapshot copies. In FIG. 6, multiple blocks could be shared between one or more files, for example indirect block 126 is shared by read-only mode 120 and read-only mode 130. Read-only mode 130 further has data block 131, indirect block 133 and data block 134 pointed by indirect block 133. Similarly, read-only mode 120 has indirect blocks 123, 126 that are being shared. The indirect block 123 further includes data block 124, 125. The indirect block 127 further includes data block 128, 129.

Figure 7:
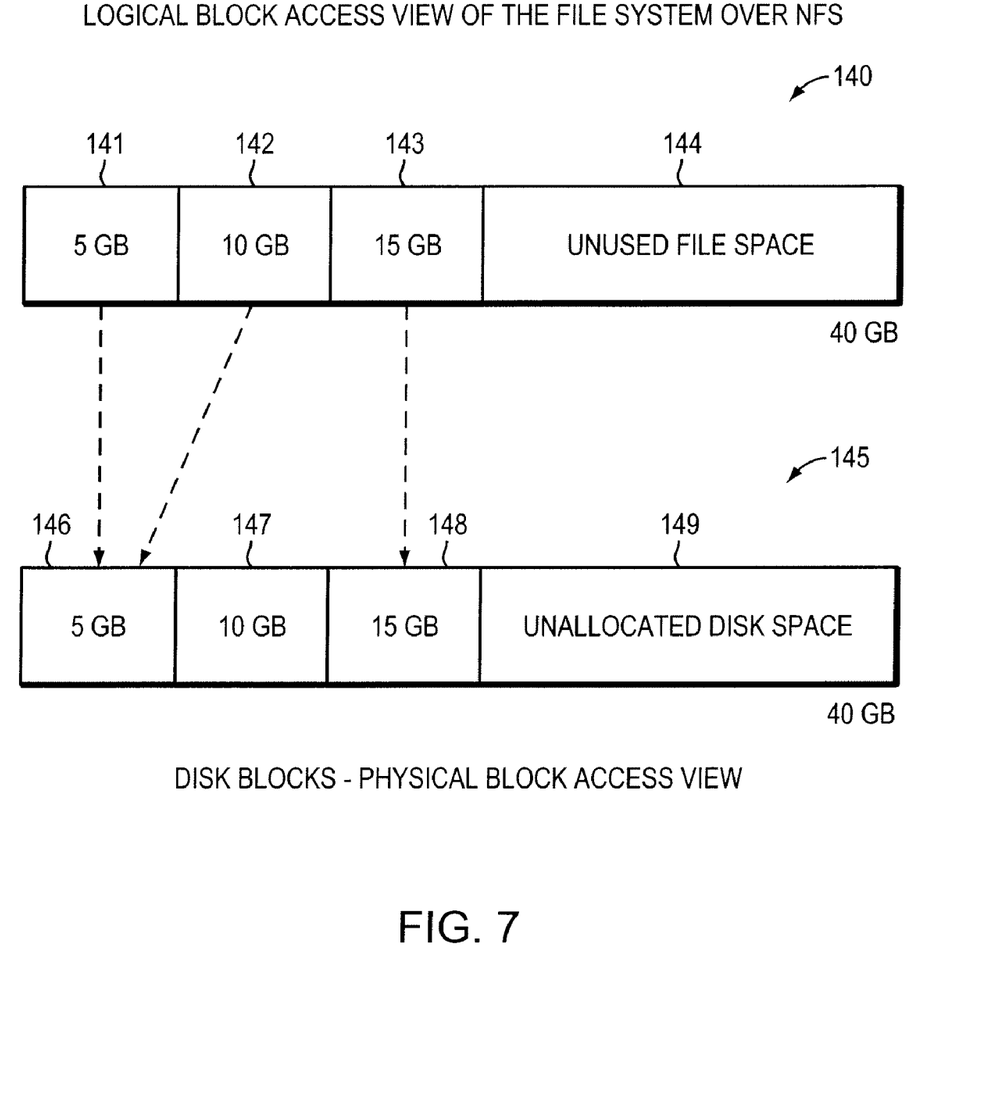
FIG. 7 is a block diagram showing logical and physical view of a file accessed by a client of a host in FIG. 1.

Referring to FIG. 7, File system 140 available to clients of Hypervisor has a fixed capacity and space is reserved for the NFS datastore and will be available to all of the virtual storage devices. There may be several files 141-143 ranging in size for example from 5 GB to 15 GB. They may not be allocating the full complement of their defined space because only the amount of space that is being requested by the virtual machines in Hypervisor is being used. This space may eventually be used for other file systems or virtual disk or snaps but for the moment it is not used. Each of the varying size files could be a view of individual virtual machine on the host. These files 141-143 maps to a physical block 145-148 on disk storage. The files 141-142 could share the same physical block 146. There could also be unused file space 144 which could in future be mapped to unallocated disk space 149 when needed.

Figure 8:
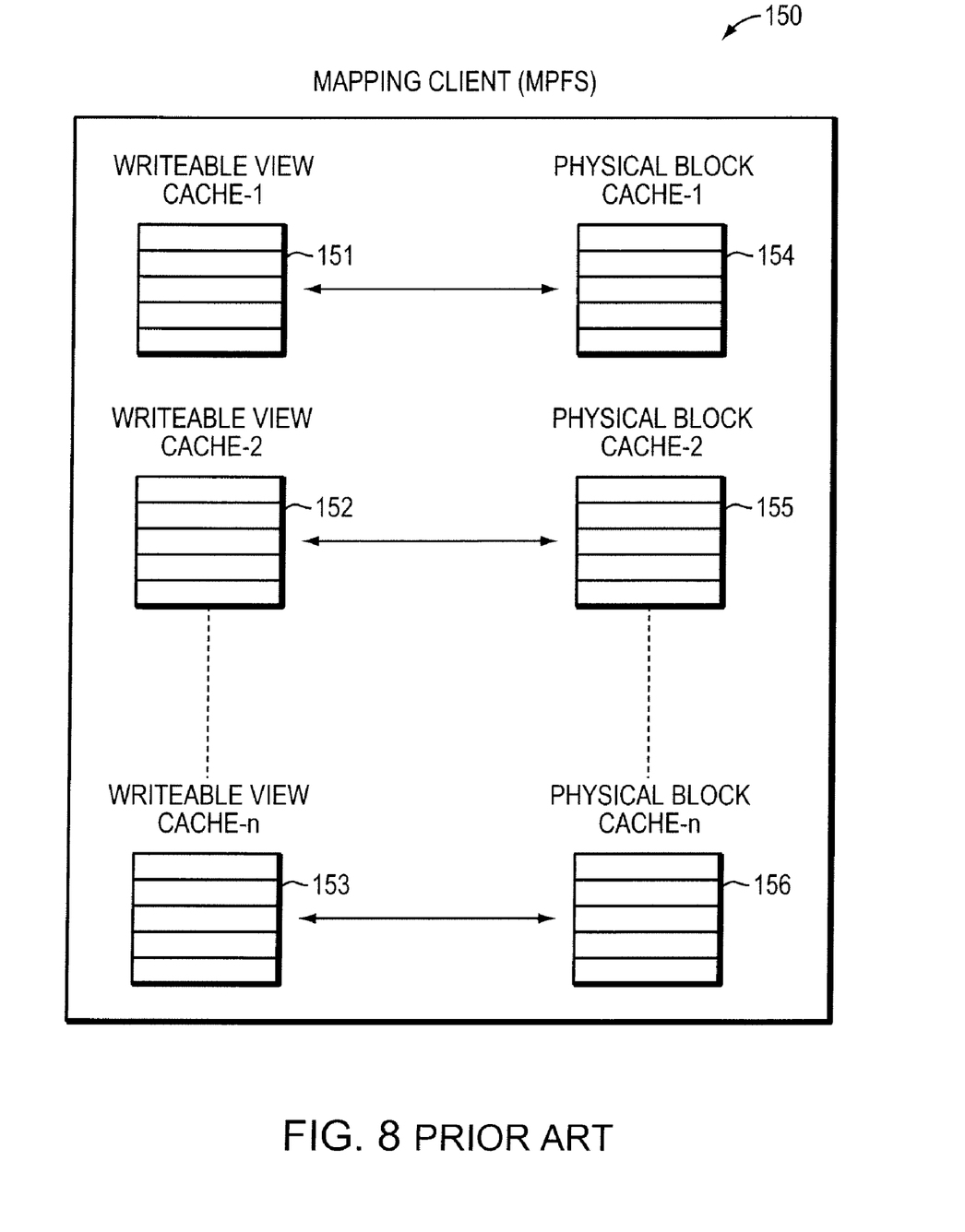
FIG. 8 is a block diagram showing a logical to physical mapping of a file cached in a conventional mapping client.

FIG. 8 shows the information included in the mapping client 150 under the prior art. For a set of files, there are distinct maps for each file and distinct block caches for each file. There is no block cache that understands commonality of data between various files. Writeable view cache-1 151 represents the logical view of set of files used by clients of a file server. Physical block cache-1 154 represents the set of physical blocks that are mapped to logical blocks of a set of files under writeable view 151. Similarly writeable view cache-2 152 is mapped to set of physical blocks under physical block cache-2 155 and writeable view cache-3 153 is mapped to set of physical blocks under physical block cache-3 156. Even though some of the physical blocks could be shared between cache-1, cache-2 or cache-3, the various logical views of the file has no knowledge of the block shared between various views which results in a multiple I/Os to be generated to access a single physical block as multiple files access the same block.

Figure 9:
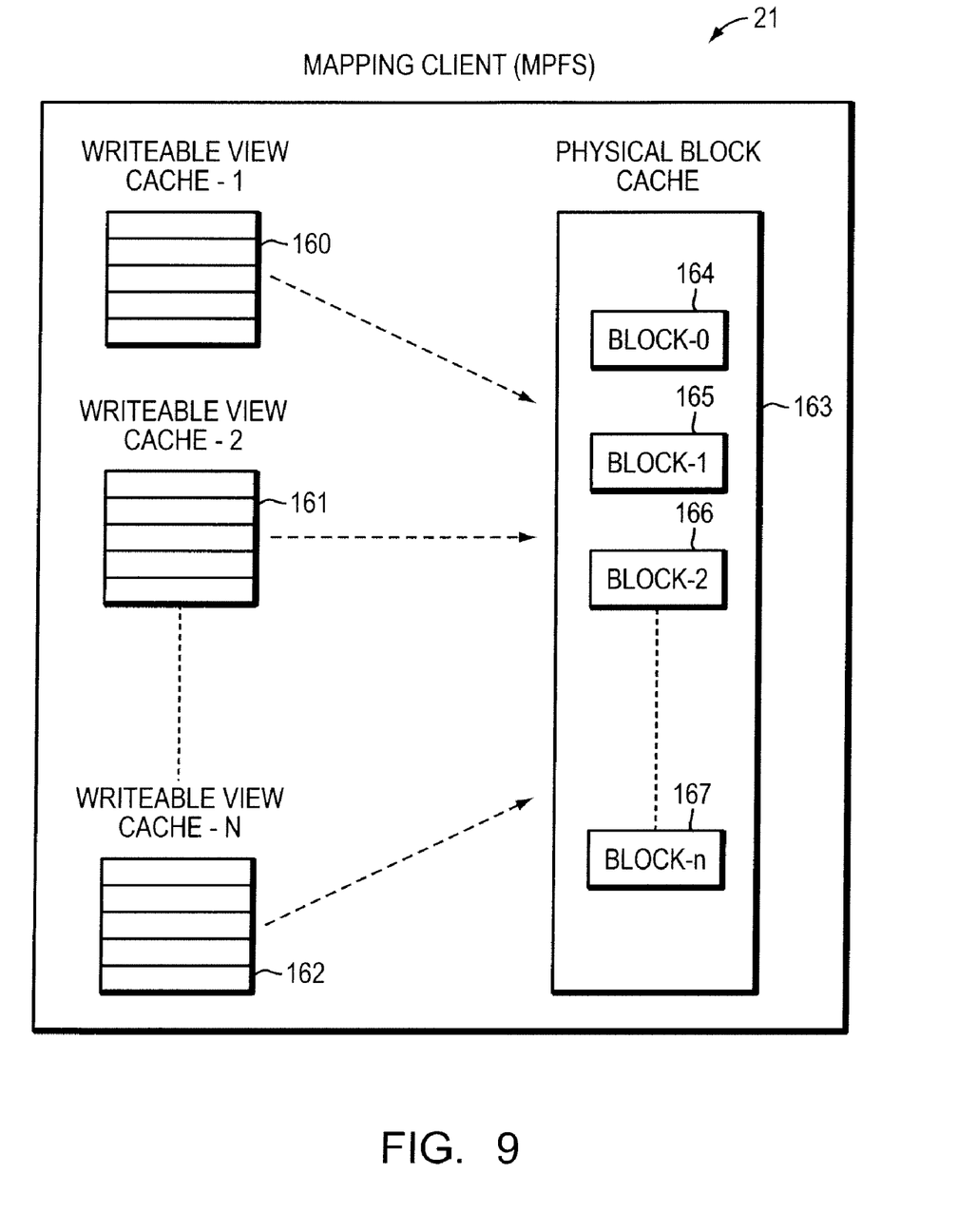
FIG. 9 is a block diagram showing a logical to physical mapping of a file cached in a mapping client of FIG. 1.

FIG. 9 shows the mapping client 21 used by a host providing virtualization, where each writeable view cache 160, 161, 162 represents a distinct view of a virtual machine running on a host server. Mapping client further includes a physical block cache 163 which caches the physical blocks 164-167 mapped to the logical blocks of the files belonging to various writeable views 160-162 of host server. By integrating a mapping client into a Hypervisor and extending file version semantics to the logical view of the files and allowing virtual machines access to the special block sharing views of file resources, it dramatically decrease the amount of I/O required by caching common blocks of data at the Hypervisor level. A set of physical servers running a Hypervisor and a mapping client that supports physical block caching accessing a common shared file system exported by the file server reduces the I/O significantly. This file system has special files supported by version set that share common blocks. These version files are the boot and data volumes for the many different virtual machines on the physical servers. As independent virtual machines boot and generate I/O to these block sharing files, the maps for these files are retrieved by the mapping client in the Hypervisor, and common blocks are cached in the physical block cache included in the mapping client. This dramatically increases storage efficiency, as well as decreases the overall I/O requirements of the system.

Further Operation Details

Figure 10:
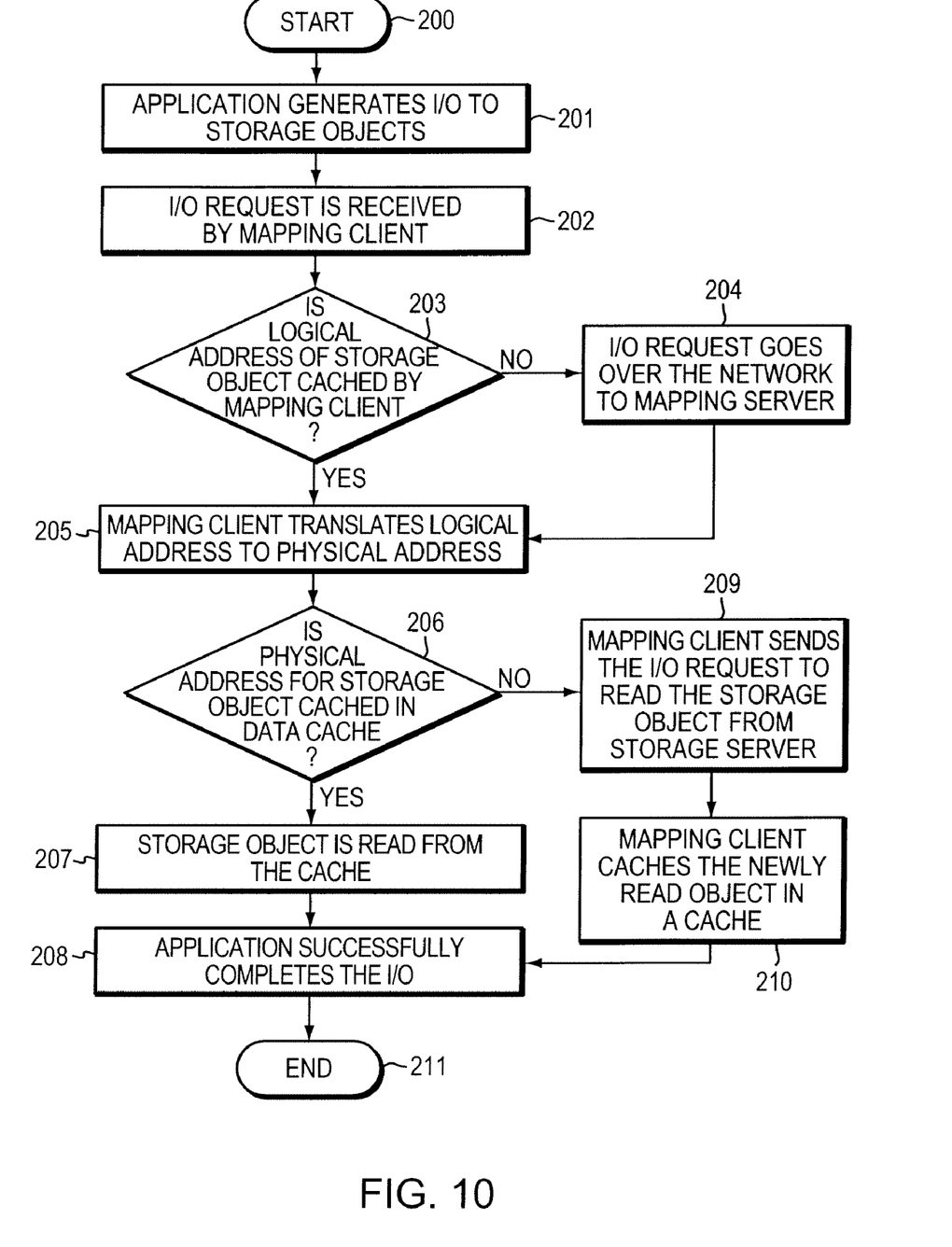
FIG. 10 is a flow logic diagrams illustrating a method of performing an I/O by a virtual machine of FIG. 1.
Figure 11:
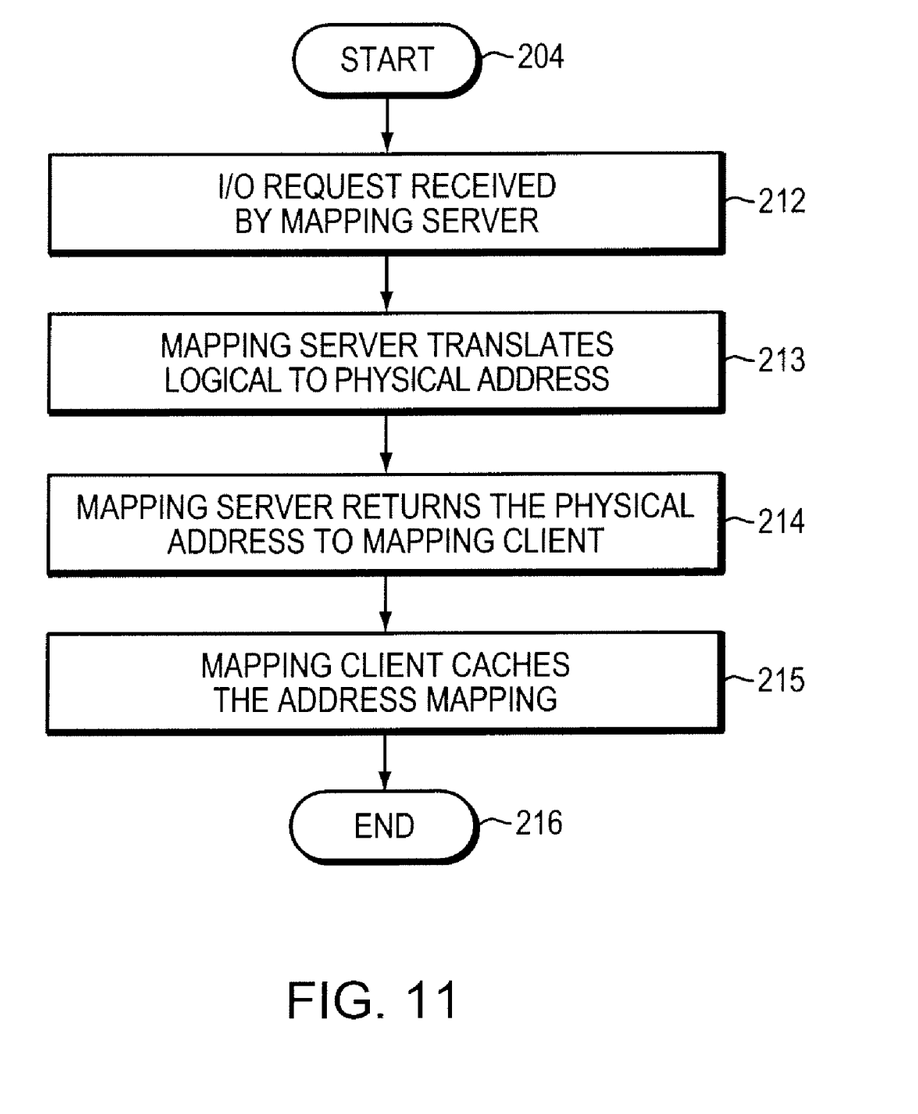
FIG. 11 shows additional method steps for retrieving a physical mapping of a file from a mapping server to complete the I/O of FIG. 9.
Figure 12:
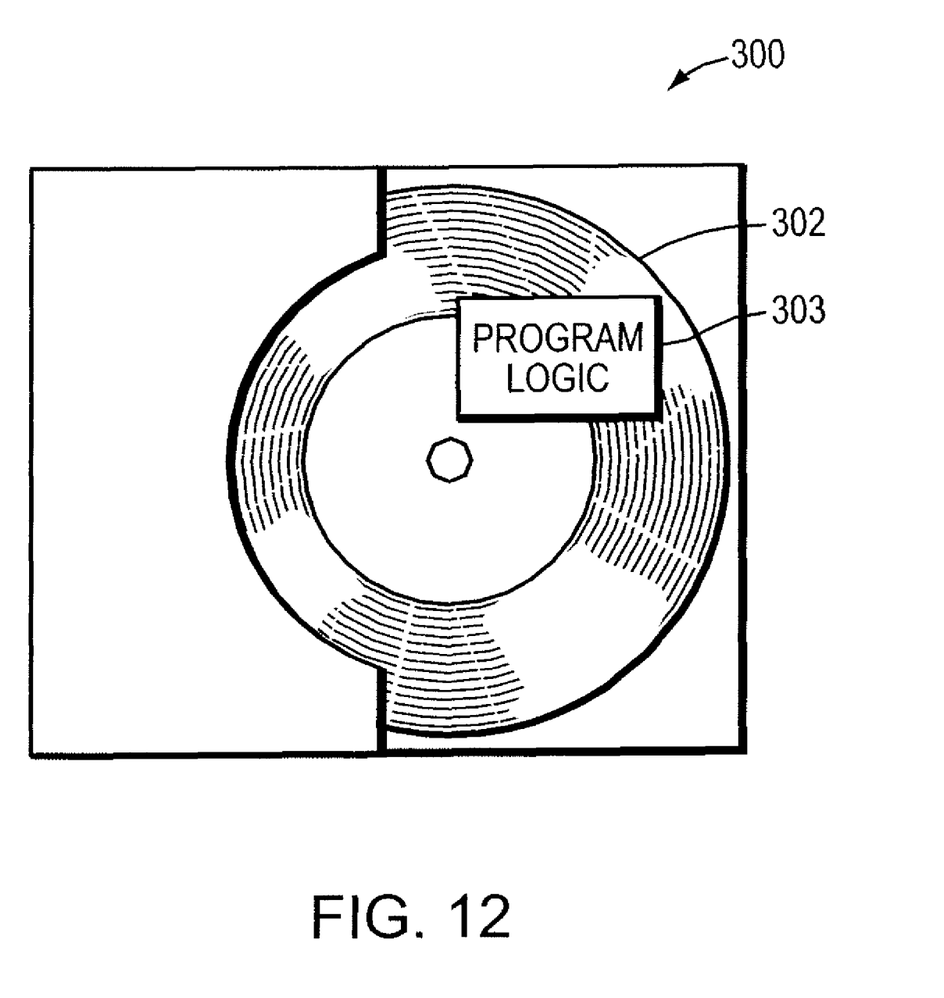
FIG. 12 shows a storage application for carrying out the methodology described herein and a computer medium including software described herein.

Reference will be made below to FIGS. 10-12 to describe a problem solved with the architecture described above with reference to FIGS. 1-9; however, a general overview is now given. The inventors have critically recognized that when consolidating hundreds of Virtual Machines in a virtualization environment, it requires hundred times the storage of a single virtual machine as each virtual machine presenting logical extent of a file do not share the physical blocks containing the same data. For example, 100 copies of the database of 1 Gigabyte in size would require 100 Gigabyte storage space to store all the copies. This approach does not scale in a data storage environment where user is trying to consolidate thousands of such virtual machines. This approach further generates thousand times the I/O on a single shared resource on these virtual machines.

This problem is addressed with the architecture of the present invention by integrating the version files in the mapping client which allows keeping only unique blocks and the blocks are shared among one or more files. In the example of database system above, under the architecture of present invention, only one instance of the database is actually stored. Each subsequent instance is just referenced back to the one saved copy. Therefore in this example, a 100 Gigabyte storage demand could be reduced to only one Gigabyte. Additionally, the present invention supports a physical block cache which decreases the I/O cost by caching the shared blocks in the Hypervisor which are used by one or more virtual machines. The present invention thus decreases the storage cost, the I/O requirement by hundred times and at the same time improves the efficiency, scalability and performance of the virtualized environment.

FIG. 10 shows the process of performing an I/O issued by an application running in a client of the storage server. In step 200, application issues an I/O on its logical storage object. The I/O is issued in step 201. The I/O for example could be issued by a virtual machine running in a Hypervisor against the version files which supports the block sharing and are exported by a file server and viewed as a logical extent by a virtual machine. The I/O request goes through a mapping client included in the client of the storage server under step 202. The mapping client first checks in step 203 if the mapping client includes the mapping for the logical addressable storage object. On finding the mapping in step 205, the mapping client translates the logical address of the storage object referenced by the application to physical address and proceeds to finding the physical storage object in a data cache in step 206.

In step 206, the physical address of the storage object is checked in the data cache. On finding the storage object in a data cache in step 207, I/O is completed successfully in step 208 and processing ends in step 211. If in step 203, mapping for logically addressable storage object is not present in the mapping client, the client communicates with the mapping server included in the storage server in 204 to retrieve the logical to physical address mapping.

If in step 206, the physical address for a storage object is not found in the cache, the mapping client sends the I/O request to the data storage system in step 209 to retrieve the storage object. Mapping client issues an I/O request to disk storage to retrieve the contents of the physical storage object referenced by the physical address. Under step 210, it is cached inside a physical data cache so that mapping client does not issue an I/O request to disk storage to retrieve the same object again and thus saving an I/O request over the network FIG. 11 shows method steps required for retrieving a physical mapping of a file from a mapping server to complete the I/O of step 204. Mapping server receives the I/O request from the mapping client in step 212. Mapping server then translates the logical block address against which an I/O was issued to physical block address in step 213 and sends that mapping back to the mapping client in step 214. Under step 215, the mapping client caches the mapping in its mapping table so that next time an I/O is issued against the same logical block; it does not need to retrieve the mapping from the mapping server and saves the I/O request over the IP network to the file server. In step 216, the address mapping is returned to the mapping client.

FIG. 12 shows the storage application 300 and Computer-readable medium 302 that includes program logic 303. Such a medium may be represented by any or all of those described at the beginning of this Detailed Description.

What is claimed is:

1. A system for performing an I/O in a storage virtualization environment, the system comprising:

a storage server in the storage virtualization environment, including a mapping service, wherein the storage server in communication with the mapping service organizes one or more storage objects as a set of related objects indicating a portion of data that is shared among the one or more storage objects;

a data storage system in the storage virtualization environment, wherein the data storage system in communication with the storage server provides a pool of storage resources to the storage server for storing the one or more storage objects as a set of virtual devices that share from the pool of storage resources; and a client of the storage server including a mapping client for the mapping service and a data cache, wherein the client of the storage server in communication with the storage server and the data storage system presents a storage object of the one or more storage objects as a logical addressable storage object to one or more applications running on the client of the storage server and the mapping client provides the one or more application a mapping between a logical addressable storage object to its physical location on the data storage system and uses the data cache to store the physical location and contents of the one or more storage objects;

wherein the one or more storage objects is represented by one or more files;

wherein the storage server is represented by a file server in communication with the data storage system;

wherein the data storage system provides the logical disk storage to the file server for storing the one or more files;

wherein the one or more files are organized as a version set by the file server indicating a set of physical blocks that are shared among the one or more files;

wherein the one or more files organized as the version set represents the logical disk storage for respective virtual machines of a group of one or more virtual machines in the storage virtualization environment; and wherein the version set is a sparse snapshot of the file of the one or more files.

2. The system of claim 1, wherein the mapping service is represented by a mapping server included in the file server, wherein the mapping server contains the mapping between a logical address of a block and a physical address of the block belonging to a file of the one or more files organized as a version set on the file server.

3. The system of claim 1, wherein the data cache is represented by a physical block cache, wherein the physical block cache stores address and content of a physical block of a data stored on the data storage system.

4. The system of claim 1, wherein the application running on the client of the storage server is represented by a virtual machine, wherein the virtual machine is a representation of a real machine using software that provides an operating system environment.

5. The system of claim 1, wherein the client of the storage server is represented by a Hypervisor, wherein the Hypervisor in communication with the file server and the data storage system presents the one or more files organized as a version set on the file server as volumes with a Logical Unit Number to one or more virtual machines running on the Hypervisor and the mapping client provides the virtual machine of the one or more virtual machines a mapping between a logical address of a block and the physical address of the block belonging to a file of the one or more files and uses the physical block cache to store the address and content of the block stored on the data storage system.

6. The system of claim 5, wherein the mapping client included in the Hypervisor further includes the information if a physical block is shared by one or more logical blocks.

7. The system of claim 5, wherein the file of one or more files organized as a version set on the file server represents a boot and a data volume for one or more virtual machines running on the Hypervisor.

8. A method for performing an I/O on a storage object of one or more storage objects in a storage virtualization environment, the environment including a storage server, a data storage system and a client of a storage server, wherein the data storage system in communication with the storage server provides a pool of storage resources to the storage server for storing the one or more storage objects as a set of virtual devices that share from the pool of storage resources organized as a set of related objects indicating a portion of data that is shared among the one or more storage objects, wherein the storage object of the one or more storage object is presented by the client of the storage server as a logical addressable object to one or more applications running on the client, the method comprising the steps of:

retrieving from a mapping client a physical address for a logical addressable storage object on which I/O is generated by an application, wherein the mapping client resides in the client of the storage server and provides the application a mapping of the logical addressable storage object to its physical location on the data storage system;

examining a data cache included in the client of the storage server to determine the availability of the storage object in the data cache, wherein the data cache contains the physical address and content of the one or more storage objects accessed by previous I/O operations; and completing the I/O on finding the storage object in the data cache;

wherein the one or more storage objects is represented by one or more files;

wherein the storage server is represented by a file server in communication with the data storage system;

wherein the data storage system provides the logical disk storage to the file server for storing the one or more files;

wherein the one or more files are organized as a version set by the file server indicating a set of physical blocks that are shared among the one or more files;

wherein the one or more files organized as the version set represents the logical disk storage for respective virtual machines of a group of one or more virtual machines in the storage virtualization environment; and wherein the version set is a sparse snapshot of the file of the one or more files.

9. The method of claim 8, wherein providing, by the mapping client, the application a mapping of the logical addressable storage object to its physical location on the data storage system comprises the steps of:

sending the I/O request to a mapping service on not finding the physical address for the logically addressable storage object in the mapping client, wherein the mapping service is included in the storage server and translates the logical address of a storage object to a physical address on the data storage system and returns the address to the mapping client;

sending the I/O request to the data storage system to retrieve the storage object from the physical storage; and caching the physical address and the content of the storage object block in a data cache included in the client of the storage server.

10. The method of claim 8, wherein the step of caching the storage object in the data cache is performed in response to a determination of an attribute of a storage object indicating that the portion of the data is shared among one or more storage objects.

11. The method of claim 8, wherein the mapping service is represented by a mapping server included in the file server, wherein the mapping server contains the mapping between a logical address of a block and a physical address of the block belonging to a file of the one or more files organized as a version set on the file server.

12. The method of claim 8, wherein the data cache is represented by a physical block cache, wherein the physical block cache stores address and content of a physical block of a data stored on the data storage system.

13. The method of claim 8, wherein the application running on the client of the storage server is represented by a virtual machine, wherein the virtual machine is a representation of a real machine using software that provides an operating system environment.

14. The method of claim 8, wherein the client of the storage server is represented by a Hypervisor, wherein the Hypervisor in communication with the file server and the data storage system presents the one or more files organized as a version set on the file server as volumes with a Logical Unit Number to one or more virtual machines running on the Hypervisor and the mapping client provides the virtual machine of the one or more virtual machines a mapping between a logical address of a block and the physical address of the block belonging to a file of the one or more files and uses the physical block cache to store the address and content of the block stored on the data storage system.

15. The method of claim 14, wherein the mapping client included in the Hypervisor further includes the information if a physical block is shared by one or more logical blocks.

16. The method of claim 8, wherein the file of the one or more files organized as a version set on the file server represents a boot and a data volume for one or more virtual machines running on the Hypervisor.

17. A system for performing an I/O in a storage virtualization environment, the system comprising:
- a storage server in the storage virtualization environment, including a mapping service, wherein the storage server in communication with the mapping service organizes one or more storage objects as a set of related objects indicating a portion of data that is shared among the one or more storage objects;
- a data storage system in the storage virtualization environment, wherein the data storage system in communication with the storage server provides a pool of storage resources to the storage server for storing the one or more storage objects as a set of virtual devices that share from the pool of storage resources;
- a client of the storage server including a mapping client for the mapping service and a data cache, wherein the client of the storage server in communication with the storage server and the data storage system presents a storage object of the one or more storage objects as a logical addressable storage object to one or more applications running on the client of the storage server and the mapping client provides the one or more application a mapping between a logical addressable storage object to its physical location on the data storage system and uses the data cache to store the physical location and contents of the one or more storage objects; and
- a program logic in communication with the data storage system and the file server for carrying out the steps of:
  - retrieving from the mapping client a physical address for a logical addressable storage object on which I/O is generated by an application, wherein the mapping client resides in the client of the storage server and provides the application a mapping of the logical addressable storage object to its physical location on the data storage system;
  - examining the data cache included in the client of the storage server to determine the availability of the storage object in the data cache, wherein the data cache contains the physical address and content of the one or more storage objects accessed by previous I/O operations; and
  - completing the I/O on finding the storage object in the data cache wherein the one or more storage objects is represented by one or more files;
- wherein the storage server is represented by a file server in communication with the data storage system;
- wherein the data storage system provides the logical disk storage to the file server for storing the one or more files;
- wherein the one or more files are organized as a version set by the file server indicating a set of physical blocks that are shared among the one or more files;
- wherein the one or more files organized as the version set represents the logical disk storage for respective virtual machines of a group of one or more virtual machines in the storage virtualization environment; and
- wherein the version set is a sparse snapshot of the file of the one or more files.

18. A computer program product for performing an I/O on a storage object of one or more storage objects, the computer program product operating in a storage virtualization environment that includes a storage server, a data storage system and a client of the storage server, wherein the data storage system in communication with the storage server provides a pool of storage resources to the storage server for storing the one or more storage objects as a set of virtual devices that share from the pool of storage resources organized as a set of related objects indicating a portion of data that is shared among the one or more storage objects, wherein the storage object of the one or more storage objects is presented to an application running in the client as a logically addressable storage object, wherein the computer program product includes computer-executable logic encoded on a non-transitory computer-readable medium for executing the following steps:
- retrieving from a mapping client a physical address for a logical addressable storage object on which I/O is generated by an application, wherein the mapping client resides in the client of the storage server and provides the application a mapping of the logical addressable storage object to its physical location on the data storage system;
- examining a data cache included in the client of the storage server to determine the availability of the storage object in the data cache, wherein the data cache contains the physical address and content of the one or more storage objects accessed by previous I/O operations; and
- completing the I/O on finding the storage object in the data cache;
- wherein the one or more storage objects is represented by one or more files;
- wherein the storage server is represented by a file server in communication with the data storage system;
- wherein the data storage system provides the logical disk storage to the file server for storing the one or more files;
- wherein the one or more files are organized as a version set by the file server indicating a set of physical blocks that are shared among the one or more files;
- wherein the one or more files organized as the version set represents the logical disk storage for respective virtual machines of a group of one or more virtual machines in the storage virtualization environment; and
- wherein the version set is a sparse snapshot of the file of the one or more files.

* * * * *